(12) United States Patent
Peng et al.

(10) Patent No.: US 10,977,521 B2
(45) Date of Patent: Apr. 13, 2021

(54) MULTI-SCALE AWARE PEDESTRIAN DETECTION METHOD BASED ON IMPROVED FULL CONVOLUTIONAL NETWORK

(71) Applicant: JIANGNAN UNIVERSITY, Wuxi (CN)

(72) Inventors: Li Peng, Wuxi (CN); Hui Liu, Wuxi (CN); Jiwei Wen, Wuxi (CN); Linbai Xie, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 16/618,269

(22) PCT Filed: Jun. 27, 2018

(86) PCT No.: PCT/CN2018/093046
§ 371 (c)(1),
(2) Date: Nov. 29, 2019

(87) PCT Pub. No.: WO2019/232836
PCT Pub. Date: Dec. 12, 2019

(65) Prior Publication Data
US 2021/0056351 A1  Feb. 25, 2021

(30) Foreign Application Priority Data

Jun. 4, 2018 (CN) .......................... 201810563873.1

(51) Int. Cl.
*G06K 9/62* (2006.01)
*G06N 3/08* (2006.01)
*G06F 9/54* (2006.01)

(52) U.S. Cl.
CPC .......... *G06K 9/6257* (2013.01); *G06F 9/545* (2013.01); *G06K 9/6202* (2013.01); *G06K 9/6232* (2013.01); *G06N 3/08* (2013.01)

(58) Field of Classification Search
CPC .. G06K 9/6257; G06K 9/6202; G06K 9/6232; G06F 9/545; G06N 3/08
(Continued)

(56) References Cited

U.S. PATENT DOCUMENTS

| 9,858,496 B2 * | 1/2018 | Sun ...................... G06K 9/3233 |
| 2018/0137647 A1 * | 5/2018 | Li ........................ G06K 9/4628 |
| 2018/0158189 A1 * | 6/2018 | Yedla .................. G06K 9/4628 |

FOREIGN PATENT DOCUMENTS

| CN | 106874894 A | 6/2017 |
| CN | 108090417 A | 5/2018 |

OTHER PUBLICATIONS

"Face Detect Method Based on Fully-connected Neutral Network", Luning Wei, Master Thesis, Zhejiang University, published Jan. 15, 2018.

* cited by examiner

*Primary Examiner* — Michael R Neff
(74) *Attorney, Agent, or Firm* — SZDC Law P.C.

(57) ABSTRACT

The present invention relates to the field of pedestrian detection, and particularly relates to a multi-scale aware pedestrian detection method based on an improved full convolutional network. Firstly, a deformable convolution layer is introduced in a full convolutional network structure to expand a receptive field of a feature map. Secondly, a cascade-region proposal network is used to extract multi-scale pedestrian proposals, discriminant strategy is introduced, and a multi-scale discriminant layer is defined to distinguish pedestrian proposals category. Finally, a multi-scale aware network is constructed, a soft non-maximum (Continued)

suppression algorithm is used to fuse the output of classification score and regression offsets by each sensing network to generate final pedestrian detection regions. Experiments show that there is low detection error on the datasets Caltech and ETH, and the proposed algorithm is better than the current detection algorithms in terms of detection accuracy and works particularly well with far-scale pedestrians.

10 Claims, 6 Drawing Sheets

(58) Field of Classification Search
USPC .......................................................... 382/159
See application file for complete search history.

(a) Near-scale (Height ≥50 pixels)

(b) Far-scale (Height<50 pixels)

MULTI-SCALE AWARE PEDESTRIAN DETECTION METHOD BASED ON IMPROVED FULL CONVOLUTIONAL NETWORK

This application is the National Stage Application of PCT/CN2018/093046, filed on Jun. 27, 2018, which claims priority to Chinese Patent Application No.: 201810563873.1, filed on Jun. 4, 2018, which is incorporated by reference for all purposes as if fully set forth herein.

BACKGROUND OF THE INVENTION

1. Field of the Invention

The present invention relates to the field of pedestrian detection technologies, and in particular, to a multi-scale aware pedestrian detection method based on an improved full convolutional network.

2. Description of the Related Art

In recent years, with spread of technologies such as intelligent video surveillance, advanced driver assistance systems (ADAS), content-based image or video retrieval, and human behavior analysis and development of some new applications such as household robots and pedestrian detection based on aerial images, the research of pedestrian detection technologies has become an important research subject in the field of machine vision. There are great challenges and large promotion space on the pedestrian detection technologies. The main reason is that a pedestrian target has more gesture changes than a face target, and different pedestrians in a video or picture have greatly varying scales. Because of different scenarios, light intensity, and clothes of pedestrians, it is very difficult to perform real-time pedestrian detection with high precision, especially in the field of intelligent advanced driver assistance systems.

The prior art has the following technical problems:

Due to environmental complexity, the precision of pedestrian detection using current algorithms in rainy or dark conditions cannot meet industrial requirements.

SUMMARY OF THE INVENTION

Based on this, it is necessary to provide a multi-scale aware pedestrian detection method based on an improved full convolutional network to resolve the foregoing technical problem, so that pedestrians on different scales can be detected in a complex background, thereby reducing traffic accidents. In the method, a deformable convolution layer is introduced into a full convolutional network structure, a cascaded RPN is used to extract multi-scale pedestrian proposals, a discriminant strategy is proposed, a multi-scale aware network is constructed, a Soft-NMS detection algorithm is introduced, and classification values and regression values output by networks are combined to output a result of pedestrian detection.

A multi-scale aware pedestrian detection method based on an improved full convolutional network includes:

normalizing the size of an input image into predetermined pixels, inputting the image into an RoI data layer of a ResNet-50 network, and learning pedestrian features;

extracting pedestrian regions in the image by using the first four layers of the ResNet-50 network, to generate feature maps on different scales;

introducing a deformable convolution layer and an offset layer respectively into a res5a_branch2b layer, a res5b_branch2b layer, and a res5c_branch2b layer of the ResNet-50 network, where the convolution kernel size is 3×3, the expansion size is 2, the step size is 1, and the pad is 2, and outputting a multi-scale feature map $y(p_0)$;

adding one randomly initialized 1×1 convolution to the last layers of C3, C4, and C5 respectively, and reducing an eventual output channel scale to 1024 dimensions, to implement feature sharing in each convolutional layer;

introducing a cascaded RPN into a res4f layer of the ResNet-50 network, defining a near-scale RPN and a far-scale RPN, and extracting RoIs at different heights after cascading;

determining the height of each extracted pedestrian RoI, defining a multi-scale discriminant layer according to input information of the image acquired by the cascaded RPN, and outputting near-scale RoIs-N and far-scale RoIs-F;

outputting, by the multi-scale discriminant layer, the RoIs-N and the RoIs-F on different scales respectively, and constructing a multi-scale aware network, where the multi-scale aware network is formed of a near-scale detection network and a far-scale detection network; and using a Soft-NMS algorithm to suppress generation of redundant information in a box.

In another embodiment, a formula for calculating the multi-scale feature map $y(p_0)$ in the step of "introducing a deformable convolution layer and an offset layer respectively into a res5a_branch2b layer, a res5b_branch2b layer, and a res5c_branch2b layer of the ResNet-50 network, where the convolution kernel size is 3×3, the expansion size is 2, the step size is 1, and the pad is 2, and outputting a multi-scale feature map;" is:

$$y(p_0) = \sum_{p_n \in R} w(p_n) \cdot x(p_0 + p_n + \Delta p_n),$$

where each pixel $p_n$ in a convolutional window corresponds to a weight w, $p_0$ denotes each pixel output by the window, is an input layer pixel set, a sampling position is $p_n$, an offset $\Delta p_n$ ($\{\Delta p_n | n=1, \ldots, N\}$) is used in deformable convolution to expand a receptive field of a regular grid R, N=|R| denotes a quantity of pixels in the grid, and a sampling offset position is $p_n \pm \Delta p_n$.

In another embodiment, the cascaded RPN in the step of "introducing a cascaded RPN into a res4f layer of the ResNet-50 network, defining a near-scale RPN and a far-scale RPN, and extracting RoIs at different heights after cascading;" acquires the RoIs at different heights in the following manner: changing the scale of an anchor in the cascaded RPN into 32, 64, 128, 256 or 512, where the ratio is 1:2, 1:1 or 2:1, generating 15 anchors, acquiring, by the RPN-N, a near-scale pedestrian region recommendation (reg-N) and a classification score in a sliding window manner, then using the reg-N as an input into the RPN-F, and directly acquiring, by the RPN-F, pedestrian RoIs from the original image by using an regional coordinate value of the reg-N, to obtain an eventual score value and pedestrian region recommendation.

In another embodiment, a determination process of the multi-scale discriminant layer in the step of "determining the height of each extracted pedestrian RoI, defining a multi-scale discriminant layer according to input information of the image acquired by the cascaded RPN, and outputting near-scale RoIs-N and far-scale RoIs-F;" is as follows:

defining the height $H_j=y_{max}-y_{min}$ of a bounding box j of each RoI according to the RoIs on different scales acquired by the cascaded RPN, where the average height in the $m^{th}$ layer (m=3, 4 or 5) is:

$$\overline{H}_m = \frac{\sum_{i=1}^{N}(y_{i_{max}}-y_{i_{min}})}{N}$$

where N denotes a quantity of training samples in a current layer, i denotes a pedestrian bounding box, and y denotes the vertical coordinates of an acquired pedestrian label box; and $$Scale_f = \varepsilon\left(1-\frac{H_j}{\overline{H}_m}\right)$$

introducing a symbol function ε(x), and performing determination to the output near-scale RoIs and the far-scale RoIs, $$Scale_n = \varepsilon\left(\frac{H_j}{\overline{H}_m}-1\right)$$

where $Scale_n$ denotes the near-scale network, $Scale_f$ denotes the far-scale network, if a pedestrian interest region included in the input image is determined as a far-scale pedestrian, $Scale_f$ is activated, and an RoI-F is pooled and propagated to the far-scale detection network for detection, and if the pedestrian interest region is determined as a near-scale pedestrian, $Scale_n$ is activated, and an RoI-N is pooled and propagated to the near-scale detection network for training.

In another embodiment, the structures of the near-scale detection network and the far-scale detection network in the step of "outputting, by the multi-scale discriminant layer, the RoIs-N and the RoIs-F on different scales respectively, and constructing a multi-scale aware network, where the multi-scale aware network is formed of a near-scale detection network and a far-scale detection network;" are as follows: each sub-network has two output layers, i is recommended for each target, the first output layer outputs a discrete confidence value distribution $s_i=(s_0,s_1)$, another layer outputs each bounding box regression offset value $t_i=(t_x,t_y,t_w,t_h)$, where $t_i$ designates position conversion and bounding box offset values with respect to the proposed original position and size of an object, and $t_x$, $t_y$, $t_w$, $t_h$ respectively denote the coordinates, width, and height of the bounding box.

$$s_i = \begin{cases} s_i, & iou(M,b_i) < N_t \\ s_i(1-iou(M,b_i)), & iou(M,b_i) \geq N_t \end{cases}$$

In another embodiment, in the step of "using a Soft-NMS algorithm to suppress generation of redundant information in a box.", a method for calculating Soft-NMS is:

when an IoU is less than a threshold $N_t$, it is detected that the score value is $s_i$; and after the IoU becomes greater than the threshold $N_t$, the score value $s_i$ is $s_i(1-iou(M,b_i))$; and each trained pedestrian recommendation has labels of one actual type g and one actual bounding box regression target value t*, and a multi-task loss function L is used to jointly output parameters of two detection sub-networks at each target recommendation i:

$$L=L_{cls}(s_i,g)+1[g\geq 1]L_{loc}(t_i^g,t^*), \text{ where}$$

$L_{cls}$ and $L_{loc}$ are respectively a classification function and a bounding box regression loss function, and $L_{cls}$ is a Softmax loss function and outputs an accurate value of classification.

In another embodiment, the predetermined pixels in the step of "normalizing the size of an input image into predetermined pixels, inputting the image into an RoI data layer of a ResNet-50 network, and learning pedestrian features;" are 640×480 pixels.

A computer device includes a memory, a processor and a computer program that is stored in the memory and can be run on the processor, where the processor implements, when executing the program, the steps in any method in the foregoing.

A computer readable storage medium stores a computer program thereon, where the program implements, when being executed by a processor, the steps in any method in the foregoing.

A processor is configured to run a program, where the program performs, when being run, any method in the foregoing.

In the foregoing multi-scale aware pedestrian detection method based on an improved full convolutional network, pedestrians on different scales can be detected in a complex background, thereby reducing traffic accidents. In the method, a deformable convolution layer is introduced into a full convolutional network structure, a cascaded RPN is used to extract multi-scale pedestrian proposals, a discriminant strategy is proposed, a multi-scale aware network is constructed, a Soft-NMS detection algorithm is introduced, and classification values and regression values output by networks are combined to output a result of pedestrian detection.

DETAILED DESCRIPTION OF THE PREFERRED EMBODIMENTS

To make the objectives, technical solutions, and advantages of the present invention more comprehensible, the present invention is further illustrated in detail below with reference to the accompanying drawings and the embodiments. It should be understood that the described specific embodiments are only used to explain the present invention rather than to limit the present invention.

Figure 6:
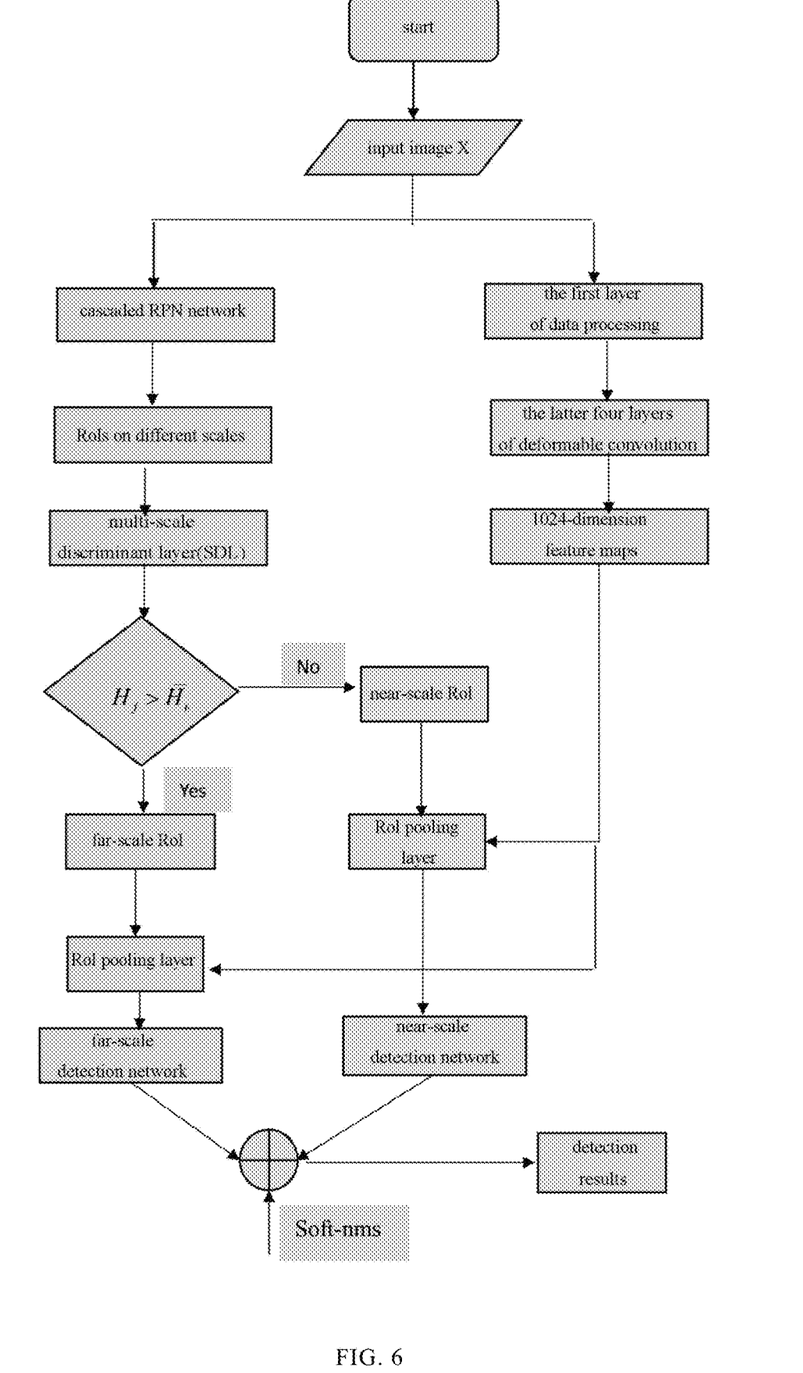
FIG. 6 is a schematic flowchart of a multi-scale aware pedestrian detection method based on an improved full convolutional network according to an embodiment of this application.

Referring to FIG. 6, a multi-scale aware pedestrian detection method based on an improved full convolutional network includes:

normalizing the size of an input image into predetermined pixels, inputting the image into an RoI data layer of a ResNet-50 network, and learning pedestrian features;

extracting pedestrian regions in the image by using the first four layers of the ResNet-50 network, to generate feature maps on different scales;

introducing a deformable convolution layer and an offset layer respectively into a res5a_branch2b layer, a res5b_branch2b layer, and a res5c_branch2b layer of the ResNet-50 network, where the convolution kernel size is 3×3, the expansion size is 2, the step size is 1, and the pad is 2, and outputting a multi-scale feature map $y(p_0)$;

adding one randomly initialized 1×1 convolution to the last layers of C3, C4, and C5 respectively, and reducing an eventual output channel scale to 1024 dimensions, to implement feature sharing in each convolutional layer;

introducing a cascaded RPN into a res4f layer of the ResNet-50 network, defining a near-scale RPN and a far-scale RPN, and extracting RoIs at different heights after cascading;

determining the height of each extracted pedestrian RoI, defining a multi-scale discriminant layer according to input information of the image acquired by the cascaded RPN, and outputting near-scale RoIs-N and far-scale RoIs-F;

outputting, by the multi-scale discriminant layer, the RoIs-N and the RoIs-F on different scales respectively, and constructing a multi-scale aware network, where the multi-scale aware network is formed of a near-scale detection network and a far-scale detection network; and using a Soft-NMS algorithm to suppress generation of redundant information in a box.

In another embodiment, a formula for calculating the multi-scale feature map $y(p_0)$ in the step of "introducing a deformable convolution layer and an offset layer respectively into a res5a_branch2b layer, a res5b_branch2b layer, and a res5c_branch2b layer of the ResNet-50 network, where the convolution kernel size is 3×3, the expansion size is 2, the step size is 1, and the pad is 2, and outputting a multi-scale feature map;" is:

$$y(p_0) = \sum_{p_n \in R} w(p_n) \cdot x(p_0 + p_n + \Delta p_n),$$

where each pixel $p_n$ in a convolutional window corresponds to a weight w, $p_0$ denotes each pixel output by the window, is an input layer pixel set, a sampling position is $p_n$, an offset $\Delta p_n$ ($\{\Delta p_n | n=1, \ldots, N\}$) is used in deformable convolution to expand a receptive field of a regular grid R, N=|R| denotes a quantity of pixels in the grid, and a sampling offset position is $p_n \pm \Delta p_n$.

In another embodiment, the cascaded RPN in the step of "introducing a cascaded RPN into a res4f layer of the ResNet-50 network, defining a near-scale RPN and a far-scale RPN, and extracting RoIs at different heights after cascading;" acquires the RoIs at different heights in the following manner: changing the scale of an anchor in the cascaded RPN into 32, 64, 128, 256 or 512, where the ratio is 1:2, 1:1 or 2:1, generating 15 anchors, acquiring, by the RPN-N, a near-scale pedestrian region recommendation (reg-N) and a classification score in a sliding window manner, then using the reg-N as an input into the RPN-F, and directly acquiring, by the RPN-F, pedestrian RoIs from the original image by using an regional coordinate value of the reg-N, to obtain an eventual score value and pedestrian region recommendation.

In another embodiment, a determination process of the multi-scale discriminant layer in the step of "determining the height of each extracted pedestrian RoI, defining a multi-scale discriminant layer according to input information of the image acquired by the cascaded RPN, and outputting near-scale RoIs-N and far-scale RoIs-F;" is as follows:

defining the height $H_j = y_{max} - y_{min}$ of a bounding box j of each RoI according to the RoIs on different scales acquired by the cascaded RPN, where the average height in the $m^{th}$ layer (m=3, 4 or 5) is:

$$\overline{H}_m = \frac{\sum_{i=1}^{N}(y_{i_{max}} - y_{i_{min}})}{N}$$

where N denotes a quantity of training samples in a current layer, i denotes a pedestrian bounding box, and y denotes the vertical coordinates of an acquired pedestrian label box; and introducing a symbol function ε(x), and performing determination to the output near-scale RoIs and the far-scale RoIs, $$Scale_n = \varepsilon\left(\frac{H_j}{\overline{H}_m} - 1\right)$$

$$Scale_f = \varepsilon\left(1 - \frac{H_j}{\overline{H}_m}\right)$$

where $Scale_n$ denotes the near-scale network, $Scale_f$ denotes the far-scale network, if a pedestrian interest region included in the input image is determined as a far-scale pedestrian, $Scale_f$ is activated, and an RoI-F is pooled and propagated to the far-scale detection network for detection, and if the pedestrian interest region is determined as a near-scale pedestrian, $Scale_n$ is activated, and an RoI-N is pooled and propagated to the near-scale detection network for training.

In another embodiment, the structures of the near-scale detection network and the far-scale detection network in the step of "outputting, by the multi-scale discriminant layer, the RoIs-N and the RoIs-F on different scales respectively, and constructing a multi-scale aware network, where the multi-scale aware network is formed of a near-scale detection network and a far-scale detection network;" are as follows:

each sub-network has two output layers, i is recommended for each target, the first output layer outputs a discrete confidence value distribution $s_i=(s_0, s_1)$, another layer outputs each bounding box regression offset value $t_i=(t_x, t_y, t_w, t_h)$ where $t_i$ designates position conversion and bounding box offset values with respect to the proposed original position and size of an object, and $t_x, t_y, t_w, t_h$ respectively denote the coordinates, width, and height of the bounding box.

In another embodiment, in the step of "using a Soft-NMS algorithm to suppress generation of redundant information in a box.", a method for calculating Soft-NMS is:

when an IoU is less than a threshold $N_t$, it is detected that the score value is $s_i$; and after the IoU becomes greater than the threshold $N_t$, the score value $s_i$ is $s_i(1-iou(M,b_i))$; and each trained pedestrian recommendation has labels of one actual type g and one actual bounding box regression target value t*, and a multi-task loss function L is used to jointly output parameters of two detection sub-networks at each target recommendation i:

$$L=L_{cls}(s_i,g)+1[g\geq 1]L_{loc}(t_i^g,t^*), \text{ where}$$

$L_{cls}$ and $L_{loc}$ are respectively a classification function and a bounding box regression loss function, and $L_{cls}$ as is a Softmax loss function and outputs an accurate value of classification.

In another embodiment, the predetermined pixels in the step of "normalizing the size of an input image into predetermined pixels, inputting the image into an RoI data layer of a ResNet-50 network, and learning pedestrian features;" are 640×480 pixels.

A computer device includes a memory, a processor and a computer program that is stored in the memory and can be run on the processor, where the processor implements, when executing the program, the steps in any method in the foregoing.

A computer readable storage medium stores a computer program thereon, where the program implements, when being executed by a processor, the steps in any method in the foregoing.

A processor is configured to run a program, where the program performs, when being run, any method in the foregoing.

In the foregoing multi-scale aware pedestrian detection method based on an improved full convolutional network, pedestrians on different scales can be detected in a complex background, thereby reducing traffic accidents. In the method, a deformable convolution layer is introduced into a full convolutional network structure, a cascaded RPN is used to extract multi-scale pedestrian proposals, a discriminant strategy is proposed, a multi-scale aware network is constructed, a Soft-NMS detection algorithm is introduced, and classification values and regression values output by networks are combined to output a result of pedestrian detection.

A specific application scenario of the present invention is described below:

Learn pedestrian features: The size of an input image is normalized into 640×480 pixels, the image is input into an "RoI data layer" of a ResNet-50 network, and pedestrian features are learned.

Extract a multi-scale feature map of pedestrians: A deformable convolution is introduced into the ResNet-50 network to expand a receptive field of a feature map, and multi-scale feature maps of pedestrians are extracted.

A deformable convolution layer and an offset layer are introduced respectively into a res5a branch2b layer, a res5b branch2b layer, and a res5c_branch2b layer, where the convolution kernel size is 3×3, the expansion size is 2, the step size is 1, the pad is 2, and the deformable convolution group is 4. A conventional convolutional output feature map $y(p_0)$ is obtained by using Equation (1):

$$y(p_0) = \sum_{p_n \in R} w(p_n) \cdot x(p_0 + p_n), \qquad (1)$$

where each pixel $p_n$ in a convolutional window corresponds to a weight w, $p_0$ denotes each pixel output by the window, x is an input layer pixel set, a sampling position is $p_n$, an offset $\Delta p_n$ ($\{\rightarrow p_n | n=1, \ldots, N\}$) is used in deformable convolution to expand a receptive field of a regular grid R, where N=|R| denotes a quantity of pixels in the grid, for example, Equation (2):

$$y(p_0) = \sum_{p_n \in R} w(p_n) \cdot x(p_0 + p_n + \Delta p_n), \qquad (2)$$

a sampling offset position is $p_n+\Delta p_n$. Because $\Delta p_n$ is a score, Equation (2) is bilinearly interpolated into $$x(p) = \sum_q G(q, p) \cdot x(q), \qquad (3)$$

where p denotes any position ($p=p_0+p_n+\Delta p_n$), q enumerates all overall spatial positions in a feature map x, $G(\cdot,\cdot)$ is a bilinear interpolation kernel, and the function G may be divided into a product of two one-dimensional kernels, $$G(q,p)=g(q_x,p_x)\cdot g(q_y,p_y) \qquad (4), \text{ where}$$

$g(x, y)=\max(0,1-|x-y|)$ may rapidly calculate the value of q when G(q,p) is not zero.

Figure 1:
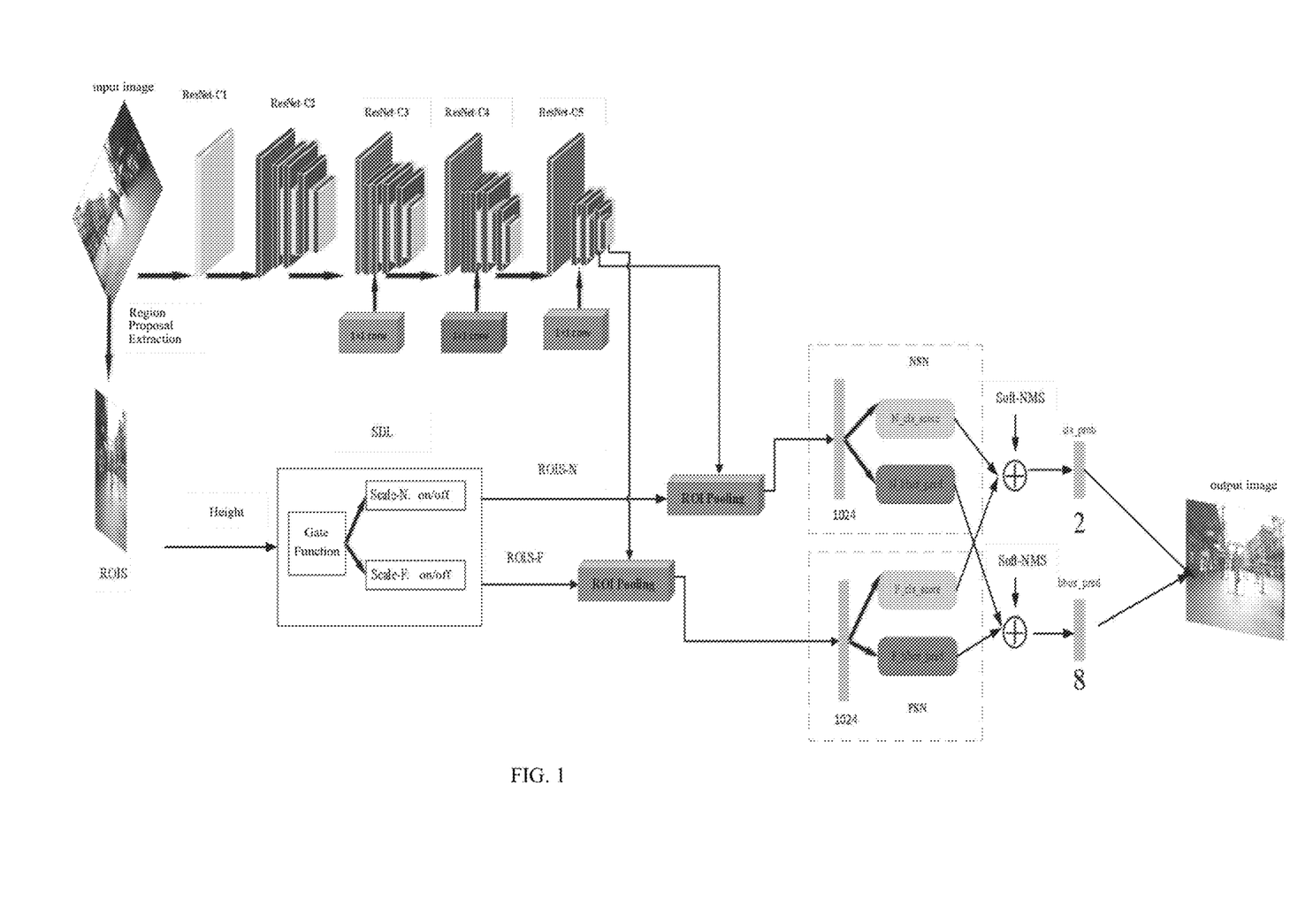
FIG. 1 is a diagram showing a network structure for a multi-scale aware pedestrian detection method based on an improved full convolutional network according to an embodiment of this application.
Figure 2:
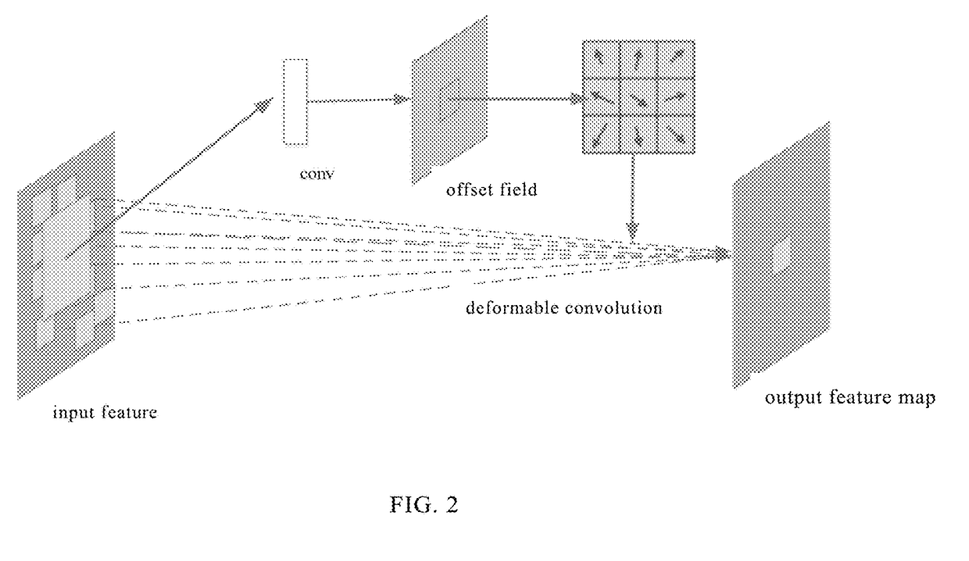
FIG. 2 is an exemplary diagram of deformable convolution in a multi-scale aware pedestrian detection method based on an improved full convolutional network according to an embodiment of this application.

An average pooling layer of a ResNet-50 model is removed. One randomly initialized 1×1 convolution is added to the last layers of C3, C4, and C5, and an eventual output channel scale is reduced to 1024 dimensions, to implement feature sharing in each convolutional layer. Spatial information in an original input image is reserved. An RoI pooling layer pools each RoI into a feature vector with a fixed length. The feature vector is propagated forward to a full connected layer, as shown in FIG. 2.

A cascaded RPN is introduced to extract a region recommendation, the region recommendation is then input into the multi-scale discriminant layer, and it is determined whether the type of a current bounding box is a near-scale pedestrian or a far-scale pedestrian.

Figure 3:
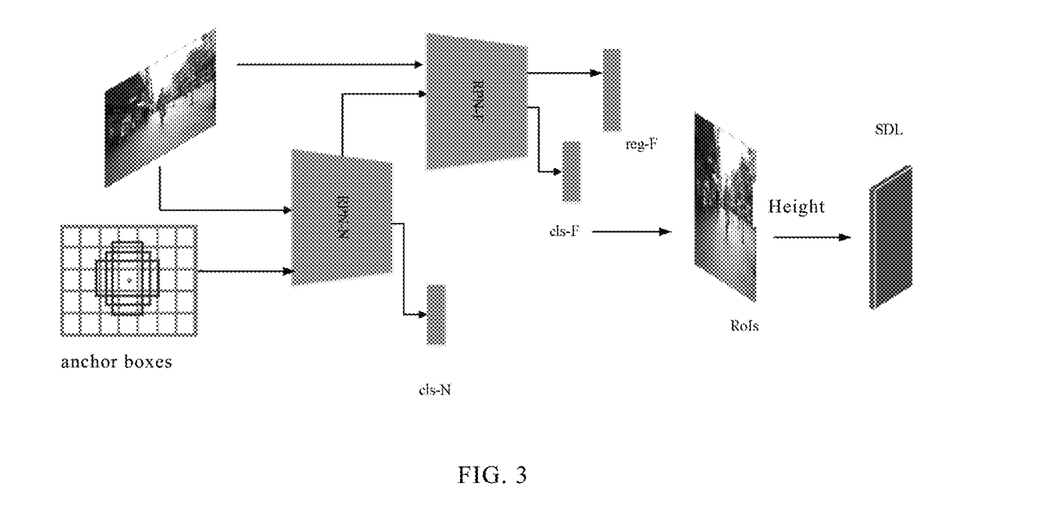
FIG. 3 is a process diagram showing that a cascaded RPN extracts recommendations on different scales in a multi-scale aware pedestrian detection method based on an improved full convolutional network according to an embodiment of this application.
Figure 4:
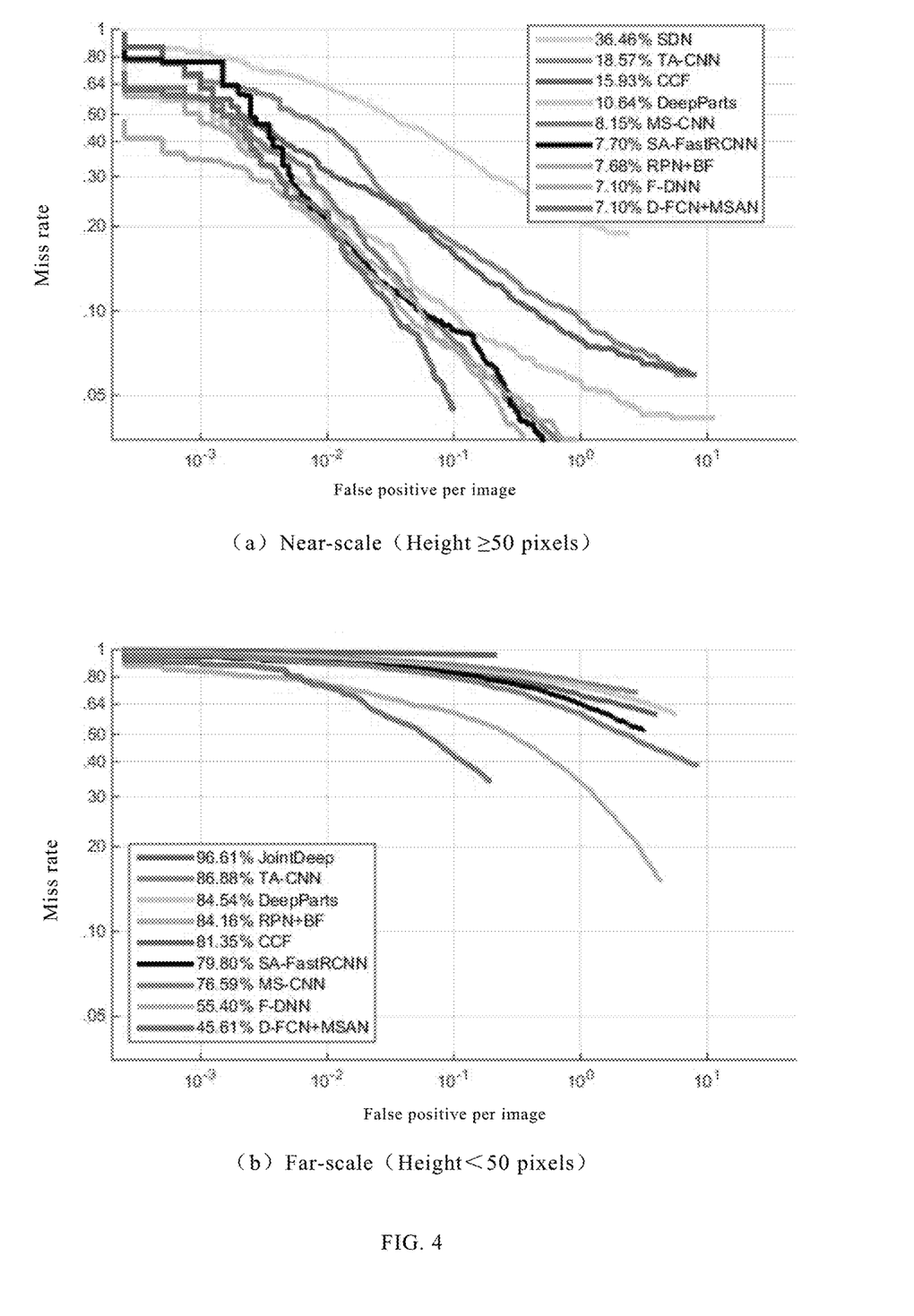
FIG. 4 is a diagram showing comparison of pedestrian multi-scale detection results using the Caltech data set in a multi-scale aware pedestrian detection method based on an improved full convolutional network according to an embodiment of this application.

The scale of an anchor is changed into 32, 64, 128, 256 or 512, where the ratio is 1:2, 1:1 or 2:1. 15 anchors are generated and used to extract RoIs on different scales in the original image. An RPN-N acquires a region recommendation (reg-N) and a classification score (cls-N) of a pedestrian in a sliding window manner, and then inputs the reg-N into the RPN-F. The RPN-F uses the acquired reg-N to acquire a pedestrian region in the original image to obtain an eventual score value (cls-F) and a region recommendation (reg-F). For the acquisition of pedestrian RoIs on different scales, in a manner of the cascaded RPN, the reg-N output by the RPN-N is used as an input to the RPN-F to replace the structure of an anchor in the RPN-F, to directly calculate an eventual region recommendation (reg-F). Compared with the sliding window manner, the calculation time can be greatly reduced, and a better effect is achieved than extraction of a pedestrian recommendation by using a single RPN, as shown in FIG. 3.

For the bounding box height $H_j = y_{max} - y_{min}$ of the pedestrian recommendation j, the average height for pedestrian recommendation in the current $m^{th}$ layer (m=3, 4 or 5) is:

$$\overline{H}_m = \frac{\sum_{i=1}^{N}(y_{i_{max}} - y_{i_{min}})}{N}$$

(N denotes a quantity of training samples in a current layer, i denotes a pedestrian bounding box, and y denotes the vertical coordinates of an acquired pedestrian label box). A symbol function ε(x) is defined:

$$Scale_n = \varepsilon\left(\frac{H_j}{5} - 1\right) \quad (5)$$

$$Scale_f = \varepsilon\left(1 - \frac{H_j}{\overline{H}_m}\right) \quad (6)$$

where $Scale_n$ denotes the near-scale network, and $Scale_f$ denotes the far-scale network. The symbol function ε(x) is denoted as:

$$\varepsilon(x) = \begin{cases} 1 & x \geq 0 \\ 0 & x < 0 \end{cases} \quad (7)$$

If a pedestrian interest region included in the input image is determined as a far-scale pedestrian, $Scale_f$ is activated, and an RoI is propagated to the far-scale network for detection, and if the pedestrian interest region is determined as a near-scale pedestrian, $Scale_n$ is activated, and an RoI is propagated to the near-scale network for training. Because each image includes a plurality of pedestrian regions, to reduce the calculation time, a multi-scale aware network (MSAN) is constructed according to a current determination mechanism.

The multi-scale discriminant layer outputs the RoIs-N and the RoIs-F on different scales respectively. A multi-scale aware network is constructed to detect RoIs on different scales respectively.

Each sub-network has two output layers, i is recommended for each target, the first output layer outputs a discrete confidence value distribution $s_i = (s_0, s_1)$, and another layer outputs each bounding box regression offset value $t_i = (t_x, t_y, t_w, t_h)$. $t_i$ designates position conversion and bounding box offset values with respect to the proposed original position and size of an object, and $t_x, t_y, t_w, t_h$ respectively denote the coordinates, width, and height of the bounding box.

A Soft-NMS algorithm is introduced to suppress generation of redundant information in a box. A conventional NMS algorithm and a Soft-NMS formula are as follows:

$$s_i = \begin{cases} s_i, & iou(M, b_i) < N_t \\ 0, & iou(M, b_i) \geq N_t \end{cases} \quad (8)$$

$$s_i = \begin{cases} s_i, & iou(M, b_i) < N_t \\ s_i(1 - iou(M, b_i)), & iou(M, b_i) \geq N_t \end{cases} \quad (9)$$

When an IoU is less than a threshold $N_t$, it is detected that the score value is $s_i$. When the IoU is greater than the threshold $N_t$, the score value is 0. The process keeps being recursively applied to the remaining detection boxes. According to the design in the algorithm, if one object is below a preset overlapping threshold, the object to be detected may fail to be detected. When Soft-NMS is used, a detection score of a non-maximum detection box is attenuated rather than completely removed. After the IoU becomes greater than the threshold $N_t$, the score value $s_i$ is 1 $s_i(1 - iou(M, b_i))$. A simple change is made to the conventional NMS algorithm, and no extra parameter is added, so that the detection precision can be improved by about 1.5% and the detection speed is increased.

Each trained pedestrian recommendation has labels of one actual type g and one actual bounding box regression target value t*. A multi-task loss function L is used to jointly output parameters of two detection sub-networks at each target recommendation i:

$$L = L_{cls}(s_i, g) + 1[g \geq 1] L_{loc}(t_i^g, t^*) \quad (10), \text{ where}$$

Figure 5:
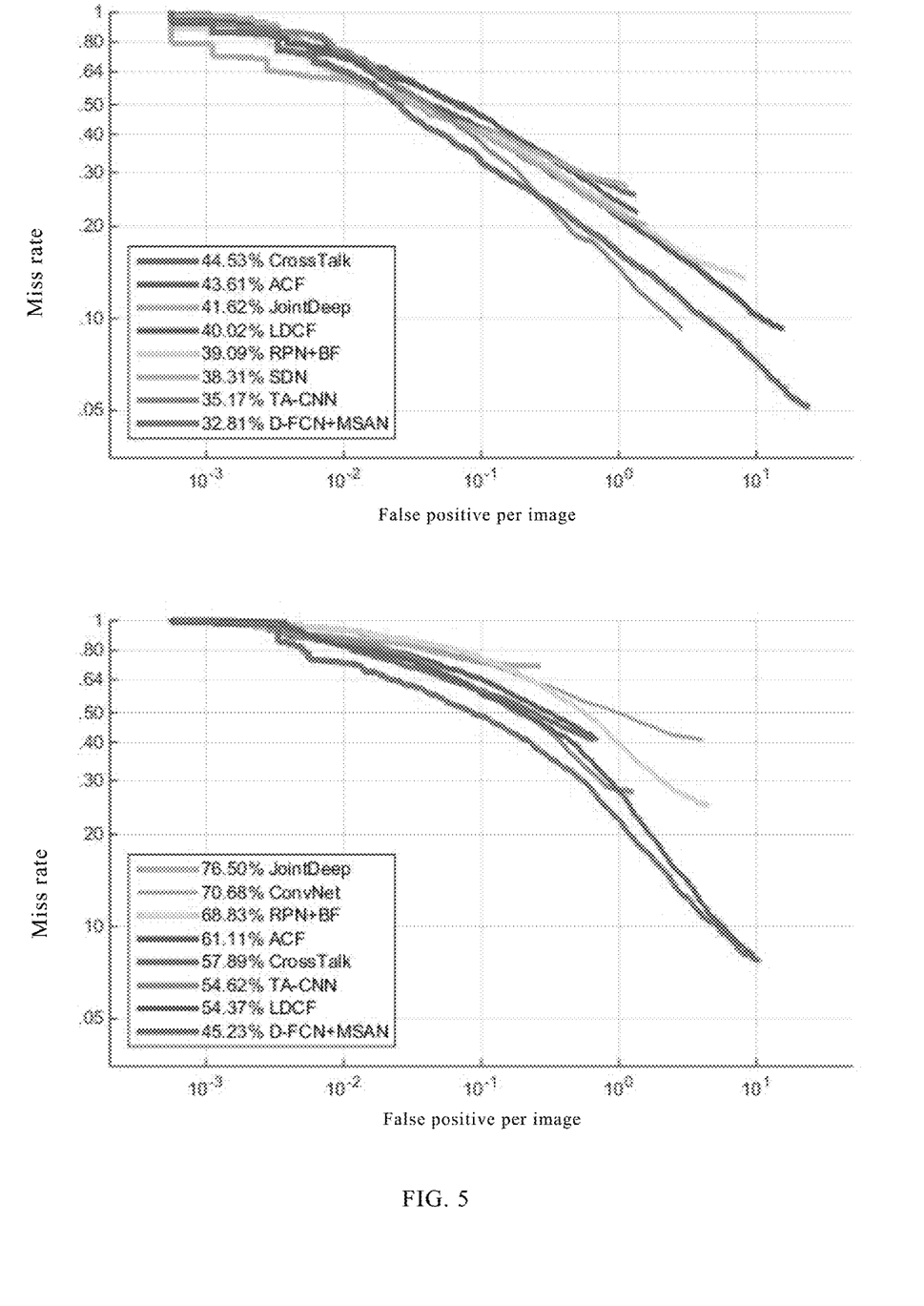
FIG. 5 is a diagram showing comparison of pedestrian multi-scale detection results using the ETH data set in a multi-scale aware pedestrian detection method based on an improved full convolutional network according to an embodiment of this application.

$L_{cls}$ and $L_{loc}$ are respectively a classification function and a bounding box regression loss function. $L_{cls}$ is a Softmax loss function and outputs an accurate value of classification. $L_{loc}$ is a smooth $L_1$ loss function and outputs the coordinates, width, and height of a bounding box. $1[g \geq 1]$ is 1 when the classification value is $g \geq 1$, or otherwise is 0. The outputs of two sub-detection networks (NSN and FSN) are combined, and the Soft-NMS algorithm is used to output a detection result. The algorithm can accurately output a detection result on input scales within different ranges, as shown in FIG. 5 and the following table.

TABLE 1

| Miss rate and detection speed | | | | |
|---|---|---|---|---|
| Algorithms | R-FCN | D-FCN | D-FCN + M SAN | SA-Fast R-CNN |
| N-Scale (MR) | 18.09% | 12.46% | 7.10% | 7.70 |
| F-Scale (MR) | 60.33% | 54.36% | 45.61% | 79.80% |
| Test Rate (s/im) | 0.11 | 0.13 | 0.18 | 0.32 |

The technical features in the foregoing embodiments may be randomly combined. For simplicity of description, all possible combinations of the technical features in the foregoing embodiments are not described. However, it should be considered that these combinations of technical features fall within the scope recorded in the specification provided that these combinations of technical features do not have any conflict.

The foregoing embodiments only describe several implementation manners of the present invention, and their description is specific and detailed, but cannot therefore be understood as a limitation to the patent scope of the present invention. It should be noted that a person of ordinary skill in the art may further make variations and improvements without departing from the conception of the present invention, and these all fall within the protection scope of the present invention. Therefore, the patent protection scope of the present invention should be subject to the appended claims.

What is claimed is:

1. A multi-scale aware pedestrian detection method based on an improved full convolutional network, comprising:

normalizing the size of an input image into predetermined pixels, inputting the image into an RoI (regions of interest) data layer of a ResNet-50 network to learn pedestrian features;

extracting pedestrian regions in the image by using first four layers of the ResNet-50 network, to generate feature maps with different scales;

introducing a deformable convolution layer and an offset layer into a res5a_branch2b layer, a res5b_branch2b layer, and a res5c_branch2b layer of the ResNet-50 network, respectively, wherein the size of a convolution kernel is 3×3, the expansion size is 2, the step size is 1, and the pad is 2, and outputting a multi-scale feature map $y(p_0)$;

adding one randomly initialized 1×1 convolution to the last layers of C3, C4, and C5 respectively, and reducing an eventual output channel scale to 1024 dimensions, to implement feature sharing in each convolutional layer;

introducing a cascaded RPN (region proposal network) into a res4f layer of the ResNet-50 network, defining a near-scale RPN and a far-scale RPN, and extracting RoIs at different heights after cascading;

determining the height of each extracted pedestrian RoI, defining a multi-scale discriminant layer according to input information of the image acquired by the cascaded RPN, and outputting near-scale RoIs-N and far-scale RoIs-F;

outputting, by the multi-scale discriminant layer, the RoIs-N and the RoIs-F on different scales respectively, and constructing a multi-scale aware network, wherein the multi-scale aware network is formed of a near-scale detection network and a far-scale detection network; and using a Soft-NMS (non-maximum suppression) algorithm to suppress generation of redundant information in a box.

2. The multi-scale aware pedestrian detection method based on an improved full convolutional network according to claim 1, wherein a formula for calculating the multi-scale feature map $y(p_0)$ in the step of "introducing a deformable convolution layer and an offset layer respectively into a res5a_branch2b layer, a res5b_branch2b layer, and a res5c_branch2b layer of the ResNet-50 network, wherein the convolution kernel size is 3×3, the expansion size is 2, the step size is 1, and the pad is 2, and outputting a multi-scale feature map;" is:

$$y(p_0) = \sum_{p_n \in R} w(p_n) \cdot x(p_0 + p_n + \Delta p_n),$$

wherein
each pixel $p_n$ in a convolutional window corresponds to a weight $w$, $p_0$ denotes each pixel output by the window, $x$ is an input layer pixel set, a sampling position is $p_n$, an offset $\Delta p_n$ ($\{\Delta p_n | n=1, \ldots, N\}$) is used in deformable convolution to expand a receptive field of a regular grid $R$, $N=|R|$ denotes a quantity of pixels in the grid, and a sampling offset position is $p_n \pm \Delta p_n$.

3. The multi-scale aware pedestrian detection method based on an improved full convolutional network according to claim 1, wherein the cascaded RPN in the step of "introducing a cascaded RPN into a res4f layer of the ResNet-50 network, defining a near-scale RPN and a far-scale RPN, and extracting RoIs at different heights after cascading;" acquires the RoIs at different heights in the following manner: changing the scale of an anchor in the cascaded RPN into 32, 64, 128, 256 or 512, wherein the ratio is 1:2, 1:1 or 2:1, generating 15 anchors, acquiring, by the RPN-N, a near-scale pedestrian region recommendation (reg-N) and a classification score in a sliding window manner, then using the reg-N as an input into the RPN-F, and directly acquiring, by the RPN-F, pedestrian RoIs from the original image by using an regional coordinate value of the reg-N, to obtain an eventual score value and pedestrian region recommendation.

4. The multi-scale aware pedestrian detection method based on an improved full convolutional network according to claim 1, wherein a determination process of the multi-scale discriminant layer in the step of "determining the height of each extracted pedestrian RoI, defining a multi-scale discriminant layer according to input information of the image acquired by the cascaded RPN, and outputting near-scale RoIs-N and far-scale RoIs-F;" is as follows:

defining the height $H_j = y_{max} - y_{min}$ of a bounding box $j$ of each RoI according to the RoIs on different scales acquired by the cascaded RPN, wherein the average height in the $m^{th}$ layer (m=3, 4 or 5) is:

$$\overline{H}_m = \frac{\sum_{i=1}^{N}(y_{i_{max}} - y_{i_{min}})}{N}$$

wherein N denotes a quantity of training samples in a current layer, i denotes a pedestrian bounding box, and y denotes the vertical coordinates of an acquired pedestrian label box;

$$Scale_f = \varepsilon\left(1 - \frac{H_j}{\overline{H}_m}\right)$$

$$Scale_n = \varepsilon\left(\frac{H_j}{\overline{H}_m} - 1\right)$$

introducing a symbol function $\varepsilon(x)$, and performing determination to the output near-scale RoIs and the far-scale RoIs, wherein $Scale_n$ denotes the near-scale network, $Scale_f$ denotes the far-scale network, if a pedestrian interest region comprised in the input image is determined as a far-scale pedestrian, $Scale_f$ is activated, and an RoI-F is pooled and propagated to the far-scale detection network for detection, and if the pedestrian interest region is determined as a near-scale pedestrian, $Scale_n$ is activated, and an RoI-N is pooled and propagated to the near-scale detection network for training.

5. The multi-scale aware pedestrian detection method based on an improved full convolutional network according to claim 1, wherein the structures of the near-scale detection network and the far-scale detection network in the step of "outputting, by the multi-scale discriminant layer, the RoIs-N and the RoIs-F on different scales respectively, and constructing a multi-scale aware network, wherein the multi-scale aware network is formed of a near-scale detection network and a far-scale detection network;" are as follows: each sub-network has two output layers, i is recommended for each target, the first output layer outputs a discrete confidence value distribution $s_i=(s_0,s_1)$, another layer outputs each bounding box regression offset value $t_i=(t_x, t_y, t_w, t_h)$, wherein $t_i$ designates position conversion and bounding box offset values with respect to the proposed original position and size of an object, and $t_x, t_y, t_w, t_h$ respectively denote the coordinates, width, and height of the bounding box.

6. The multi-scale aware pedestrian detection method based on an improved full convolutional network according to claim 1, wherein in the step of "using a Soft-NMS $$s_i = \begin{cases} s_i, & iou(M, b_i) < N_t \\ s_i(1 - iou(M, b_i)), & iou(M, b_i) \geq N_t \end{cases}$$

algorithm to suppress generation of redundant information in a box", a method for calculating Soft-NMS is:
when an IoU is less than a threshold $N_t$, it is detected that the score value is $s_i$; and after the IoU becomes greater than the threshold $N_t$, the score value $s_i$ is $s_i(1-iou(M,b_i))$; and
each trained pedestrian recommendation has labels of one actual type g and one actual bounding box regression target value t*, and a multi-task loss function L is used to jointly output parameters of two detection sub-networks at each target recommendation i:

$$L=L_{cls}(s_i,g)+1[g\geq 1]L_{loc}(t_i^g,t^*), \text{ wherein}$$

$L_{cls}$ and $L_{loc}$ are respectively a classification function and a bounding box regression loss function, and $L_{cls}$ is a Softmax loss function and outputs an accurate value of classification.

7. The multi-scale aware pedestrian detection method based on an improved full convolutional network according to claim 1, wherein the predetermined pixels in the step of "normalizing the size of an input image into predetermined pixels, inputting the image into an RoI data layer of a ResNet-50 network, and learning pedestrian features;" are 640×480 pixels.

8. A computer device, comprising a memory, a processor and a computer program that is stored in the memory and can be run on the processor, wherein the processor implements, when executing the program, the steps in the method according to claim 1.

9. A non-transitory computer readable storage medium, storing a computer program thereon, wherein the program implements, when being executed by a processor, the steps in the method according to claim 1.

10. A processor, the processor being configured to run a program, wherein the program performs, when being run, the method according to claim 1.

* * * * *